(12) United States Patent
Nolta et al.

(10) Patent No.: US 10,661,630 B2
(45) Date of Patent: May 26, 2020

(54) HVAC KINEMATICS TO PROVIDE TEMPERATURE AND MODE CONTROL WITH ONE ACTUATOR

(71) Applicant: Hanon Systems, Daejeon (KR)

(72) Inventors: Jim Nolta, Canton, MI (US); Chad Engberg, Dearborn, MI (US); David Lumley, Livonia, MI (US)

(73) Assignee: HANON SYSTEMS, Daejeon (KR)

( * ) Notice: Subject to any disclaimer, the term of this patent is extended or adjusted under 35 U.S.C. 154(b) by 34 days.

(21) Appl. No.: 15/207,580

(22) Filed: Jul. 12, 2016

(65) Prior Publication Data

US 2017/0106722 A1 Apr. 20, 2017

Related U.S. Application Data

(60) Provisional application No. 62/242,737, filed on Oct. 16, 2015.

(51) Int. Cl.
*B60H 1/00* (2006.01)
(52) U.S. Cl.
CPC .................. *B60H 1/00857* (2013.01)
(58) Field of Classification Search
CPC .................................... B60H 1/00857
USPC ......................................... 454/160
See application file for complete search history.

(56) References Cited

U.S. PATENT DOCUMENTS

| | | | | |
|---|---|---|---|---|
| 6,383,071 B1* | 5/2002 | Takeuchi | ........... | B60H 1/00842 454/121 |
| 6,702,008 B1* | 3/2004 | Hibino | ............... | B60H 1/00842 165/202 |
| 7,214,130 B2* | 5/2007 | Seki | ................... | B60H 1/00842 454/126 |
| 2002/0117296 A1* | 8/2002 | Smith | ................ | B60H 1/00028 165/202 |
| 2008/0000537 A1* | 1/2008 | Sokolofsky | ........ | B60H 1/00514 137/865 |

FOREIGN PATENT DOCUMENTS

| | | |
|---|---|---|
| JP | 2002103951 A | 4/2002 |
| JP | 2015016784 A | 1/2015 |
| KR | 20120020391 A | 3/2012 |

* cited by examiner

*Primary Examiner* — Grant Moubry
*Assistant Examiner* — Ryan L Faulkner
(74) *Attorney, Agent, or Firm* — Shumaker, Loop & Kendrick, LLP; James D. Miller

(57) ABSTRACT

An air-handling system for a heating, ventilation, and air conditioning system comprising includes a main housing, a temperature door, a mode door, and a control mechanism. The temperature door is disposed in a mixing and conditioning section of the main housing to control a temperature of a flow of air to a delivery section of the main housing. The mode door is disposed in the delivery section of the main housing to control a flow of air through an upper conduit and a lower conduit. The control mechanism cooperates with each of the temperature door and the mode door. The control mechanism includes a single actuator configured to independently control each of the temperature door and the mode door to provide independent temperature control for each of a high mode, a low mode, and a mixed mode of operation.

5 Claims, 5 Drawing Sheets

HVAC KINEMATICS TO PROVIDE TEMPERATURE AND MODE CONTROL WITH ONE ACTUATOR

CROSS-REFERENCE TO RELATED APPLICATION

This application claims priority to U.S. Provisional Patent Application Ser. No. 62/242,737, filed Oct. 16, 2015, the entire disclosure of which is hereby incorporated herein by reference.

FIELD OF THE INVENTION

The invention relates to a climate control system for a vehicle and more particularly to a climate control system for a heating, ventilating, and air conditioning system for the vehicle.

BACKGROUND OF THE INVENTION

A vehicle typically includes a climate control system which maintains a temperature within a passenger compartment of the vehicle at a comfortable level by providing heating, cooling, and ventilation. Comfort is maintained in the passenger compartment by an integrated mechanism referred to in the art as a heating, ventilation and air conditioning (HVAC) air-handling system. The air-handling system conditions air flowing therethrough and distributes the conditioned air throughout the passenger compartment.

The air-handling system commonly employs a plurality of doors within a housing to control a flow of air therethrough. For example, the air-handling system may include a temperature door for controlling a flow of air through heat exchangers that may be disposed within the housing. In some cases, the temperature door may be adjusted between a first position configured to direct an entirety of the flow of air through a heater core to add thermal energy to the flow of air, and a second position configured to direct the entirety of the flow of air through an evaporator core to remove thermal energy from the flow of air. The temperature door may further be adjusted to an intermediate position to direct a first portion of the flow of air to the heater core and a second portion of the flow of air to the evaporator core. In other cases, the evaporator core may be disposed upstream of the temperature door to cause the entirety of the flow of air to flow through the evaporator core before encountering the temperature door. In such cases, the temperature door may be adjusted between a first position configured to direct the entirety of the flow of air through the heater core and a second position configured to bypass the entirety of the flow of air through a bypass passageway, wherein the flow of the air is not subjected to additional heating by the heater core. The temperature door may further be adjusted to an intermediate position to direct a first portion of the flow of air through the heater core and a second portion of the flow of air through the bypass passageway bypassing the heater core.

The air-handling system may also include a mode door configured to control a distribution of the flow of air to the passenger compartment of the vehicle. For example, in a first position, or upper mode, the flow of air may be directed to an upper conduit and provided to a vent directed towards a windshield or a passenger within the passenger compartment. In a second position, or lower mode, the flow of air may be directed to a lower conduit and provided to a vent directed towards a floor area of the passenger compartment. Additionally, the mode door may be positioned intermediate the first position and the second position, in a mixed mode, to provide a first portion of the flow of air to the upper conduit and a second portion of the flow of air to the lower conduit.

To allow the temperature of the flow of air to be fully adjusted between a cold temperature and a hot temperature for each of the upper mode, the lower mode, and the mixed mode, each of the temperature door and the mode door must be rotated independently of each other. Typically, independent rotation of the temperature door and the mode door requires each of the temperature door and the mode door to be controlled by distinct actuators, wherein a first actuator controls the temperature door and a second actuator controls the mode door. The use of two actuators is costly, requires additional manufacturing and assembly, and necessitates independent controls for each of the actuators.

Accordingly, there exists a need in the art to efficiently and simultaneously control a temperature door and a mode door of an air-handling system in a low cost manner.

SUMMARY OF THE INVENTION

Concordant and consistent with the present invention, an efficient and low cost control mechanism for simultaneously controlling a temperature door and a mode door of an air-handling system with a single actuator has surprisingly been discovered.

In one embodiment of the invention, an air handling system for a heating, ventilation, and air conditioning system of a motor vehicle having a passenger compartment is disclosed. The air handling system comprises a main housing and a control mechanism. The main housing has each of a first door and a second door rotatably disposed therein. The control mechanism is driven by a single actuator and is configured to control a rotational position of each of the first door and the second door.

In another embodiment of the invention, an air handling system for a heating, ventilation, and air conditioning system of a motor vehicle having a passenger compartment is disclosed. The air handling system comprises a main housing and a control mechanism. The main housing has a temperature door rotatably disposed therein for controlling a temperature of air delivered to the passenger compartment and a mode door rotatably disposed therein for controlling a distribution of the air between a first region and a second region of the passenger compartment. The control mechanism is driven by a single actuator and is configured to control a rotational position of each of the temperature door and the mode door. The control mechanism comprises a temperature cam gear having a temperature cam track formed therein and a mode cam gear having a mode cam track formed therein. The mode cam gear operably engages the temperature cam gear to transfer rotational motion therebetween. One of the temperature cam gear and the mode cam gear is operably engaged with and rotated by the single actuator.

BRIEF DESCRIPTION OF THE DRAWINGS

The above, as well as other advantages of the present disclosure, will become readily apparent to those skilled in the art from the following detailed description, particularly when considered in the light of the drawings described hereinafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 6:
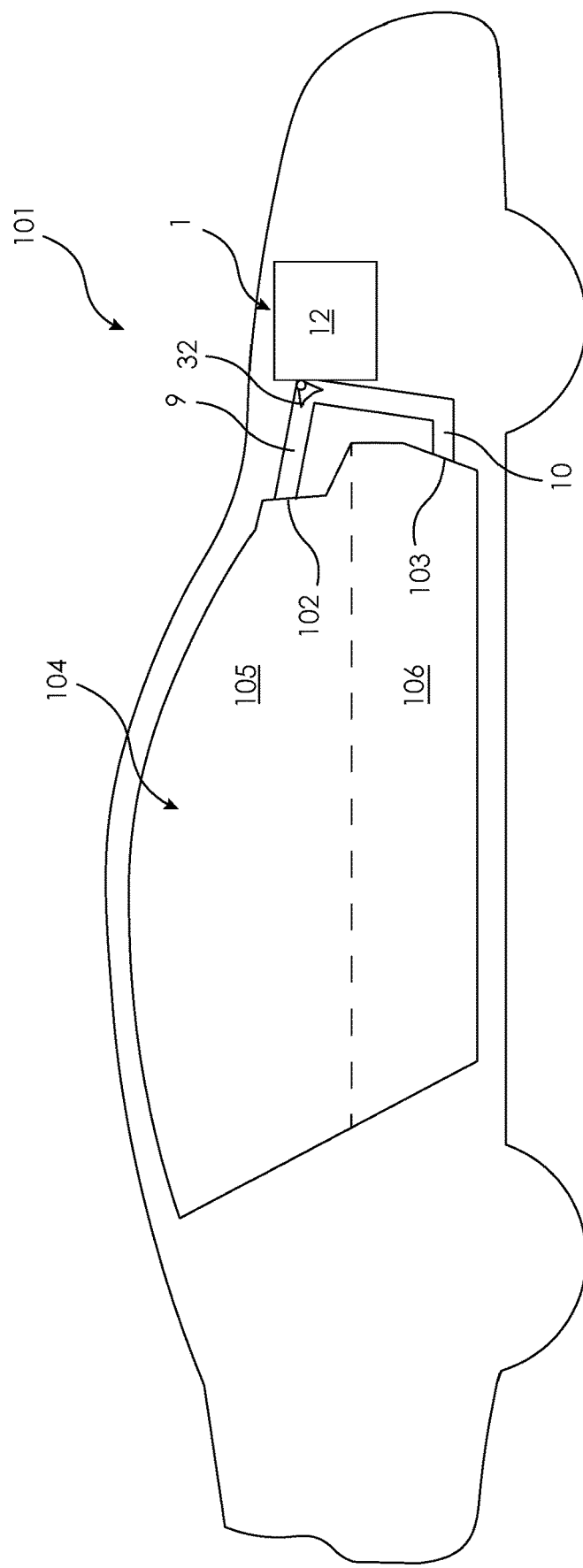
FIG. 6 is a fragmentary schematic side elevational view of a motor vehicle having the air handling system of FIGS. 1-4.

FIGS. 1-4 illustrate an air-handling system 1 of a heating, ventilating, and air conditioning (HVAC) system for a motor vehicle 101 (FIG. 6) according to an embodiment of the disclosure. As used herein, the term air can refer to fluid in a gaseous state, fluid in a liquid state, or any combination thereof. The air-handling system 1 typically provides heating, ventilation, and air conditioning for a passenger compartment 104 (FIG. 6) of the vehicle 101. The air-handling system 1 is configured for installation between vehicle sheet metal (not shown) and an interior trim panel (not shown). The air-handling system 1 can be installed in other locations in the vehicle 101 as desired such as under an instrument panel, to a dash panel, in a trunk, in a console, under a floor, in a headliner, or in an engine compartment, for example.

The air-handling system 1 includes a hollow main housing 12. The main housing 12 may be formed by the cooperation of a pair of housing shells 16. In the embodiment shown, the housing shells 16 interface with each other along peripheral regions thereof to form the hollow main housing 12. The housing shells 16 may be formed from plastic, but other materials can be used, as desired. In other embodiments, the main housing 12 may be formed by the cooperation of three or more separately formed components or housing portions, as desired.

Figure 1:
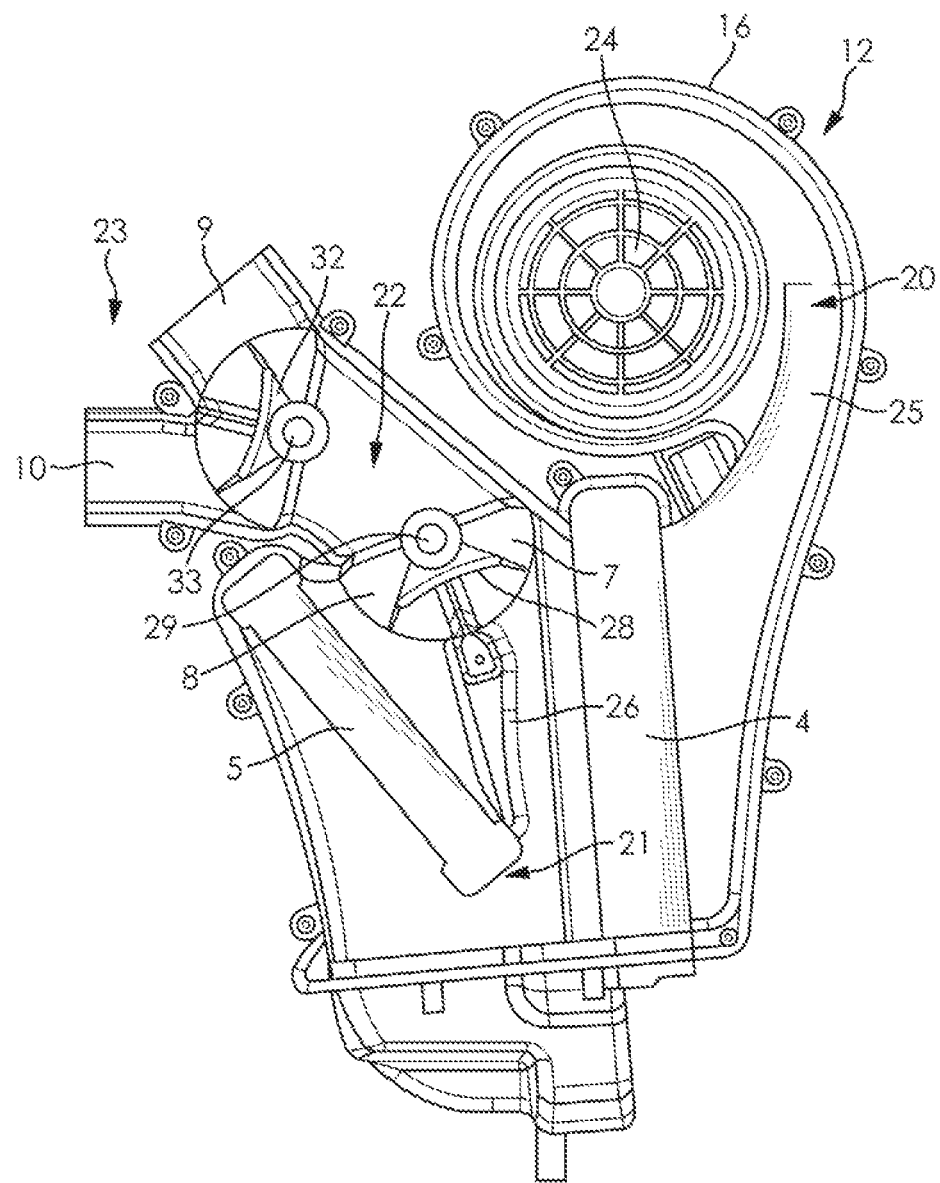
FIG. 1 is an elevational view showing an interior of a main housing of an air handling system according to an embodiment of the invention.

FIG. 1 illustrates a hollow interior of the main housing 12 with one of the two housing shells 16 cooperating to form the main housing 12 removed to better illustrate the flow path for the flow of air flowing through the main housing 12. The main housing 12 includes an inlet section 20, a conditioning section 21, a mixing section 22, and a delivery section 23. The inlet section 20 includes an air inlet 24 in fluid communication with a supply of air and an inlet conduit 25 providing fluid communication between the supply of air and the conditioning section 21 of the main housing 12. The supply of air can be provided from outside of the vehicle 101, recirculated from the passenger compartment 104 of the vehicle 101, or a mixture of the two, for example. The air inlet 24 may be formed adjacent a blower or fan (not shown) configured to promote a flow of the supply of air through the inlet conduit 25. If desired, a filter (not shown) can be provided upstream or downstream of the inlet section 20 to filter out debris or contaminants carried by the supply of air.

The conditioning section 21 may include an evaporator core 4 and a heater core 5. The evaporator core 4 may form a portion of a primary refrigerant circuit of the air conditioning system associated with the air handling system 1. The evaporator core 4 is configured to exchange heat energy between the flow of air and the refrigerant flowing through the evaporator core 4 to cool and/or dehumidify the flow of air. Although described as an evaporator core, it should be understood that any form of cooling device in heat exchange relationship with any device or system of the motor vehicle 101 may be employed for use with the air handling system 1 without departing from the scope of the present invention. The heater core 5 may form a radiator associated with a coolant circuit used to cool an engine of the motor vehicle 101. The heater core 5 is further configured to exchange heat energy between the flow of air and a coolant circulated through the coolant circuit to heat the flow of air. Alternatively, the heater core 5 may be in heat exchange relationship with a fluid used to cool a battery or other heat producing device associated with the motor vehicle 101 or the heater core 5 may be a heating device configured to produce heat using an electrical source. It should be understood that any form of heating device suitable for heating a flow of air therethrough may be used in place the heater core 5 without departing from the scope of the present invention.

As shown in FIG. 1, the evaporator core 4 may be disposed at an inlet region of the conditioning section 21 immediately downstream of the inlet conduit 25 of the inlet section 20. The evaporator core 4 extends across an entirety of a flow area at the inlet region of the conditioning section 21 to cause the entirety of the flow of air to pass through the evaporator core 4, thereby cooling and/or dehumidifying the entirety of the flow of air as the flow of air enters the conditioning section 21.

After flowing through the evaporator core 4 the flow of air encounters a baffle wall 26. A cold air passageway 7 is formed to one side of the baffle wall 26 and a warm air passageway 8 is formed to a second side of the baffle wall 26. The cold air passageway 7 may alternatively be referred to as the first passageway 7 while the warm air passageway 8 may alternatively be referred to as the second passageway 8, as desired. The warm air passageway 8 includes the heater core 5 disposed therein. The heater core 5 may be disposed across an entirety of a flow area of the warm air passageway 8, as desired. In other embodiments, only a portion of the flow area of the warm air passageway is covered by the heater core 5, as desired.

A temperature door 28 is rotatably coupled to the main housing 12 at a downstream end of each of the cold air passageway 7 and the warm air passageway 8. The temperature door 28 is disposed on a temperature door shaft 29 that is rotatably disposed in the main housing 12. A first end of the temperature door shaft 29 is received in an aperture 13 (shown in FIG. 2) of a first one of the housing shells 16 and a second end of the shaft is received through an aperture (not shown) of a second one of the housing shells 16. The temperature door shaft 29 extends from a first end of the temperature door 28 to a second end of the temperature door 28. The temperature door shaft 29 may extend outwardly beyond the first end of the temperature door 28 and outwardly beyond the second end of the temperature door 28. The temperature door shaft 30 may alternatively be flush with or recessed from the ends of the temperature door 28, as desired.

The temperature door 28 may be positioned in a first position wherein the temperature door 28 is rotated to block passage of the flow of air through the warm air passageway 8 and into the mixing section 22. When the temperature door 28 is in the first position the entirety of the flow of air is directed through the opened cold air passageway 7 and into the mixing section 22 immediately after flowing through the evaporator core 4. The temperature door 28 may alternatively be positioned in a second position wherein the temperature door 28 is rotated to block passage of the flow of air through the cold air passageway 7 and into the mixing section 22. When the temperature door 28 is in the second position the entirety of the flow of air is directed through the opened warm air passageway 8 and into the mixing section 22 immediately after flowing through the heater core 5.

The temperature door 28 may alternatively be rotated to an intermediate position between the first position and the second position, as shown in FIG. 1. When in the intermediate position, a first partial air flow of the flow of air may flow through the cold air passageway 7, past the temperature door 28, and into the mixing section 22 while a second partial air flow of the flow of air may flow through the warm air passageway 8 including the heater core 5, past the temperature door 28, and into the mixing section 22. The first partial air flow and the second partial air flow are then recombined and mixed in the mixing section 22. As should be understood, the temperature door 28 may be adjustable to a variety of intermediate positions to control a percentage of the flow of air passing through the cold air passageway 7 and the warm air passageway 8, respectively, to control a temperature of the flow of air according to desired settings of a passenger within the passenger compartment 104 of the motor vehicle 101.

The delivery section 23 of the main housing 12 includes a first conduit 9 and a second conduit 10. The first conduit 9 may be an "upper conduit" for directing the flow of air towards one or more "upper vents" 102 (FIG. 6) of the air handling system 1 directed towards a first region 105 of the passenger compartment 104 including a windshield or a passenger within the passenger compartment 104. The second conduit 10 may be a "lower conduit" for directing the flow of air towards one or more "lower vents" 103 (FIG. 6) directed towards a second region 106 of the passenger compartment 104 including a floor area of the passenger compartment 104. However, the first conduit 9 and the second conduit 10 may direct the flow of air to any two different regions or vents of the air handling system 1 without departing from the scope of the present invention.

A mode door 32 is rotatably coupled to the main housing 12 between the mixing section 22 and the delivery section 23. The mode door 32 is disposed on a mode door shaft 33 that is rotatably disposed in the main housing 12. A first end of the mode door shaft 33 is received in an aperture 14 of a first one of the housing shells 16 and a second end of the mode door shaft 33 is received in an aperture (not shown) of the second one of the housing shells 16. The mode door shaft 33 extends from a first end of the mode door 32 to a second end of the mode door 32. The mode door shaft 33 may extend outwardly beyond the first end of the mode door 32 and outwardly beyond the second end of the mode door 32. The mode door shaft 33 may alternatively be flush with or recessed from the ends of the mode door 32, as desired.

The mode door 32 may be positioned in a first position wherein the mode door 32 is rotated to block passage of the flow of air into the second conduit 10. When in the first position, the entirety of the flow of air is caused to flow through the first conduit 9. If the first conduit 9 is formed as an upper conduit of the air handling system 1, the positioning of the mode door 32 in the first position may be referred to as a "high mode" of the air handling system 1. The mode door 32 may alternatively be positioned in a second position wherein the mode door 32 is rotated to block passage of the flow of air into the first conduit 9. When in the second position the entirety of the flow of air is caused to flow through the second conduit 10. If the second conduit 10 is formed as a lower conduit of the air handling system 1, the positioning of the mode door 32 in the second position may be referred to as a "low mode" of the air handling system 1.

The mode door may alternatively be rotated to an intermediate position between the first position and the second position, as shown in FIG. 1. When in the intermediate position, a first partial air flow of the flow of air flows through the first conduit 9 while a second partial air flow of the flow of air flows through the second conduit 10. The intermediate position of the mode door 32 accordingly corresponds to a "mixed mode" of the air handling system 1. As should be understood, the mode door 32 may be adjusted to a variety of intermediate positions to control a percentage of the flow of air directed to each of the first conduit 9 and the second conduit 10 to control a venting of the flow of air into the passenger compartment 104 of the motor vehicle 101.

In traditional air handling systems of the prior art, the temperature door and the mode door of the air handling system are controlled independently by two or more actuators to achieve a variety of different flow configurations of the flow of air, thereby allowing for both a temperature and a venting direction of the flow of air to be controlled within the passenger compartment 104 of the motor vehicle 101. However, the use of two independently controlled actuators is more costly and requires additional manufacturing and assembly.

Figure 2:
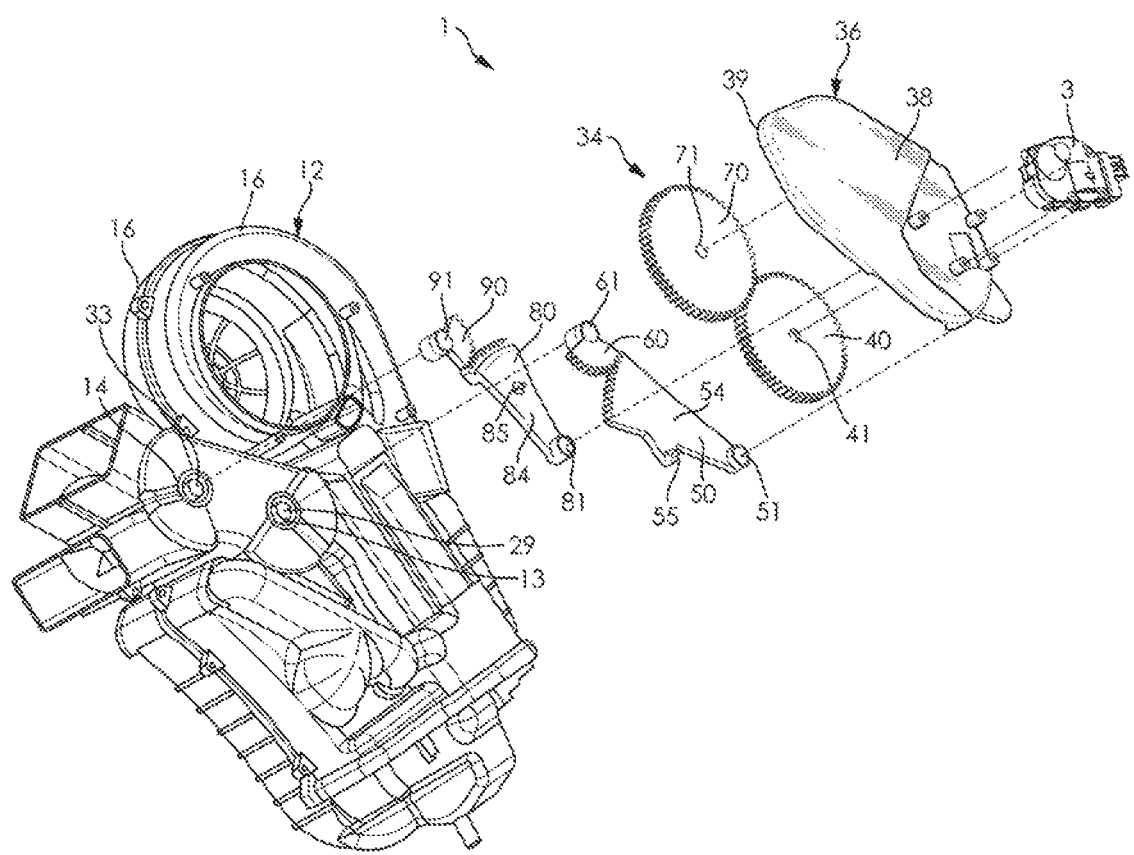
FIG. 2 is a partially exploded perspective view of the air handling system including a control mechanism according to an embodiment of the invention.
Figure 3:
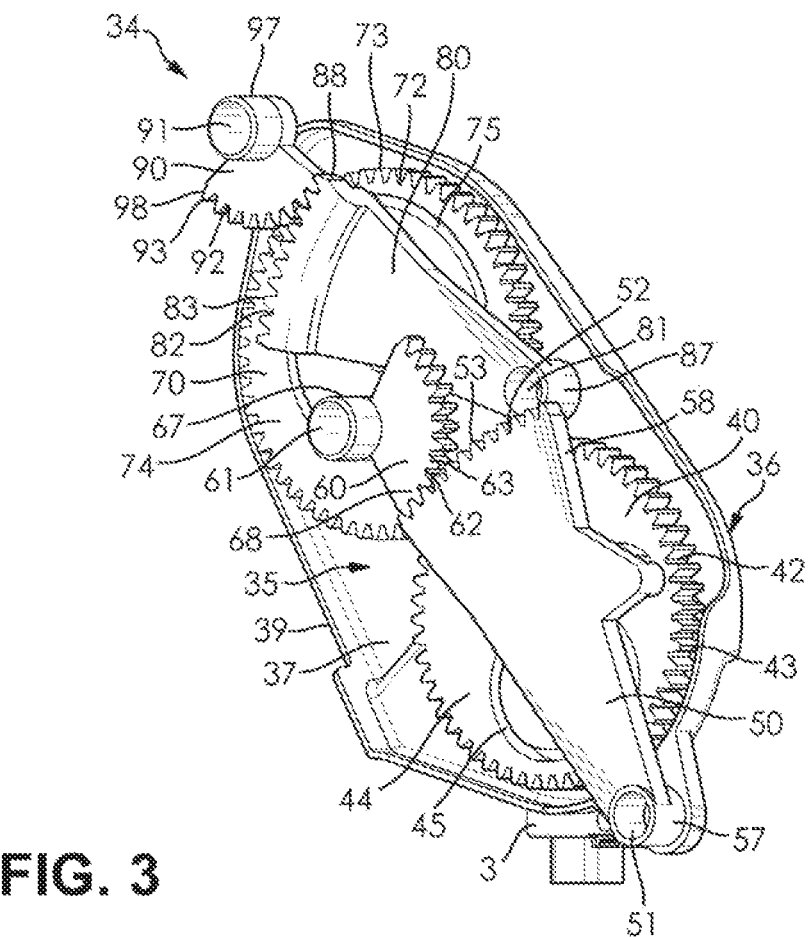
FIG. 3 is a front perspective view of the control mechanism of FIG. 2.
Figure 4:
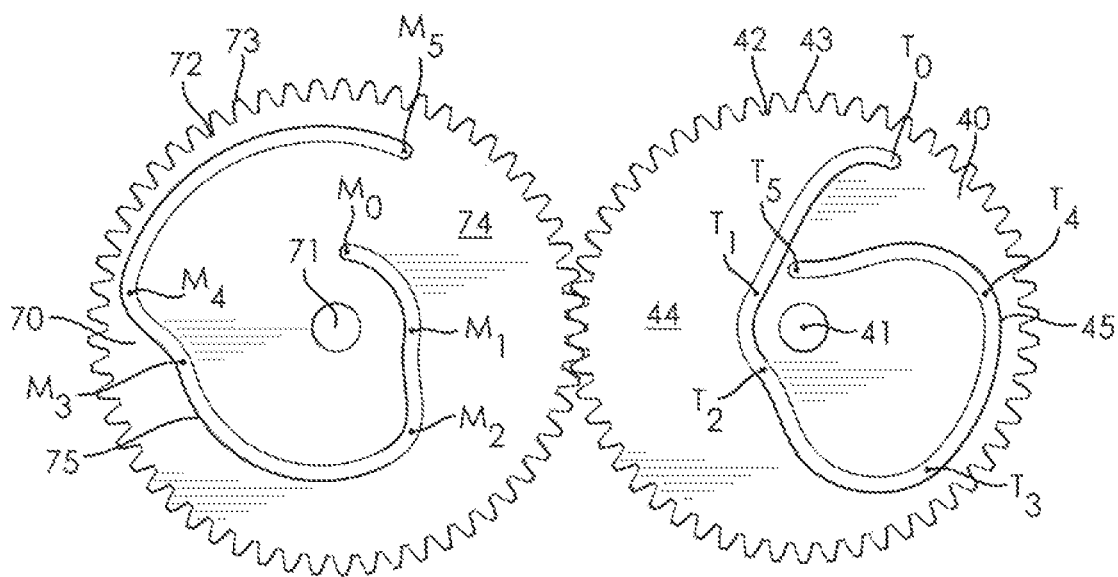
FIG. 4 is an elevational view showing a temperature cam gear and a mode cam gear of the control mechanism of FIGS. 2 and 3.

FIGS. 2-4 illustrate a control mechanism 34 configured to provide simultaneous control of each of the temperature door 28 and the mode door 32 while being driven by a single actuator 3. The control mechanism 34 includes a mounting bracket 36, a temperature cam gear 40, a temperature link gear 50, a temperature door gear 60, a mode cam gear 70, a mode link gear 80, and a mode door gear 90. As used herein, the term "gear" may refer to any component including a feature for engaging and transferring a rotational motion of the rotating component to another distinct component. The term "gear" may accordingly refer to an elongate arm having an engaging feature, such as teeth, disposed at a first end thereof for transferring the rotational motion and a rotatable connection disposed at a second end thereof to allow the arm to rotate about the second end.

The mounting bracket 36 is configured to be mounted to an exterior surface of the main housing 12, and more specifically to an exterior surface of one of the housing shells 16. The mounting bracket 36 may be mounted to the main housing 12 using any known method or coupling device. In some embodiments, the mounting bracket 36 includes apertures (not shown) configured for alignment with apertures formed in the main housing 12 to allow for traditional fastening devices to be fed therethrough to couple the mounting bracket 36 to the main housing 12. In other embodiments, the mounting bracket 36 is coupled to the main housing 12 by connection of the components of the control mechanism 34 to each of the temperature door 28 and the mode door 32, as explained in greater detail hereinafter.

The mounting bracket 36 includes a first surface 37 (shown in FIG. 3) and an oppositely arranged second surface

38 (shown in FIG. 2). The first surface 37 is configured to be in facing relationship with an exterior surface of the main housing 12 when the mounting bracket 36 is coupled thereto. A peripheral rim 39 of the mounting bracket 36 may extend outwardly from a periphery of the first surface 37 and in a direction towards the exterior surface of the main housing 12. The first surface 37, the peripheral rim 39, and the exterior surface of the main housing 12 cooperate to enclose a compartment 35 having the temperature cam gear 40, the temperature link gear 50, the temperature door gear 60, the mode cam gear 70, the mode link gear 80, and the mode door gear 90 disposed therein.

The actuator 3 is coupled to the second surface 38 of the mounting bracket 36. The actuator 3 may be coupled to the mounting bracket 36 using any known coupler such as threaded fasteners, for example. The actuator 3 may be any known actuator capable of producing and transferring torque to the components forming the control mechanism 34. The actuator 3 may be mechanically operated, electrically operated, fluid operated, or otherwise operated, for example. The actuator 3 may be an electronic motor driven rotary actuator, as a non-limiting example. A portion of the actuator 3 extends through the mounting bracket 36 and beyond the first surface 37 thereof to engage a portion of the temperature cam gear 40.

The temperature cam gear 40 is rotatably coupled to the actuator 3. The actuator 3 accordingly is configured to transfer torque to the temperature cam gear 40 to cause the temperature cam gear 40 to rotate about a rotational axis 41 thereof. The temperature cam gear 40 is mechanically engaged with the actuator 3 by any known coupling or structure suitable for transferring rotational motion between two rotating components. The temperature cam gear 40 may for example include an axle (not shown) extending therefrom in parallel to the rotational axis 41 and engaging a rotating portion of the actuator 3 to transfer the rotational motion of the actuator 3 to the temperature cam gear 40. Alternatively, the actuator 3 may include a projecting rotating arm extending into and engaging a surface defining an aperture formed in the temperature cam gear 40 to transfer the rotational motion of the actuator 3 to the temperature cam gear 40. The temperature cam gear 40 is accordingly caused to rotate about the rotational axis 41 in response to rotation of the actuator 3.

The temperature cam gear 40 further includes an outer circumferential surface 42 including a plurality of teeth 43 extending radially outwardly from the outer circumferential surface 42 relative to the rotational axis 41. The temperature cam gear 40 may include any suitable number of the teeth 43 and the teeth 43 may have any suitable size and profile for mating with teeth 73 of the mode cam gear 70. Each of the teeth 43 may for example have an involute tooth profile, but any suitable tooth profile may be used without departing from the scope of the present invention. The temperature cam gear 40 may be a spur gear wherein the outer circumferential surface 42 of the temperature cam gear 40 may be substantially circular in shape and arranged concentrically relative to the rotational axis 41 of the temperature cam gear 40.

The temperature cam gear 40 further includes a planar face 44 extending between the rotational axis 41 and the outer circumferential surface 42 thereof while arranged on a plane perpendicular to the rotational axis 41. A temperature cam track 45 is formed in the face 44 of the temperature cam gear 40. The temperature cam track 45 may be a slot or opening having a preselected shape. The temperature cam track 45 has a varying distance from the rotational axis 41 of the temperature cam gear 40 as the temperature cam track 45 extends in a circumferential direction in respect of the temperature cam gear 40 around the rotational axis 41. A shape of the temperature cam track 45 is described in greater detail hereinafter with reference to the operation of the control mechanism 34.

The mode cam gear 70 is rotatably coupled to the mounting bracket 36 about a rotational axis 71 thereof arranged in parallel to the rotational axis 41 of the temperature cam gear 40. The mode cam gear 70 is rotatably coupled to the mounting bracket 36 using any known coupling or structure suitable for transferring rotational motion. The mode cam gear 70 may for example include an axle (not shown) extending in parallel to the rotational axis 71 and rotatably engaging a surface defining an aperture (not shown) formed in the mounting bracket 36 to allow the mode cam gear 70 to rotate about the rotational axis 71 relative to the stationary mounting bracket 36. Alternatively, an axle (not shown) may extend from the mounting bracket 36 for engaging a surface of the mode cam gear 70 defining a central aperture therein, for example.

The mode cam gear 70 further includes an outer circumferential surface 72 including a plurality of the teeth 73 extending radially outwardly from the outer circumferential surface 72 relative to the rotational axis 71. The mode cam gear 70 may include any suitable number of the teeth 73 and the teeth 73 may have any suitable size and profile for mating with and operably engaging the teeth 43 of the temperature cam gear 40. Each of the teeth 73 may for example have an involute tooth profile, but other tooth profiles may be used without departing from the scope of the present invention. The mode cam gear 70 may be a spur gear wherein the outer circumferential surface 72 of the mode cam gear 70 may be substantially circular in shape and arranged to rotate about the rotational axis 71 of the mode cam gear 70.

The mode cam gear 70 further includes a planar face 74 formed between the rotational axis 71 and the outer circumferential surface 72 thereof while arranged on a plane perpendicular to the rotational axis 71. A mode cam track 75 is formed in the face 74 of the mode cam gear 70. The mode cam track 75 has a varying distance from the rotational axis 71 of the mode cam gear 70 as the mode cam track 75 extends in a circumferential direction in respect of the mode cam gear 70 around the rotational axis 71. A shape of the mode cam slot 75 is described in greater detail hereinafter with reference to the operation of the control mechanism 34.

The temperature cam gear 40 and the mode cam gear 70 may have the same outer diameter resulting in the temperature cam gear 40 and the mode cam gear 70 having a gear ratio of 1:1. Accordingly, when the temperature cam gear 40 is rotated through a given angle of rotation, the mode cam gear 70 will similarly be rotated through the same angle of rotation in a rotational direction opposite the temperature cam gear 40. However, one skilled in the art should appreciate that different gear ratios and configurations may be used between the temperature cam gear 40 and the mode cam gear 70 without departing from the scope of the present invention.

The temperature link gear 50 is formed from an elongate main body extending from a first end 57 to a second end 58 thereof. The first end 57 of the main body is rotatably coupled to the mounting bracket 36 and forms a rotational axis 51 of the temperature link gear 50 arranged parallel to the rotational axes 41, 71. The temperature link gear 50 may be rotatably coupled to the mounting bracket 36 using any known coupling or structure suitable for transferring rotational motion. The temperature link gear 50 may for example include an axle (not shown) extending from the first end 57 of the main body parallel with the rotational axis 51 and rotatably engaging a surface defining an aperture (not shown) formed in the mounting bracket 36 to allow the temperature link gear 50 to rotate about the rotational axis 51 relative to the stationary mounting bracket 36. Alternatively, an axle (not shown) may extend from the mounting bracket 36 for engaging a surface defining an aperture formed in the temperature link gear 50. As shown, the rotational axis 51 of the temperature gear link 50 is spaced apart from the rotational axis 41 of the temperature cam gear 40, although other configurations can be used.

The second end 58 of the main body is substantially arcuate and forms an outer circumferential surface 52 of the temperature link gear 50. The second end 58 of the main body includes a plurality of teeth 53 extending radially outwardly relative to the rotational axis 51 of the temperature link gear 50. The temperature link gear 50 may include any suitable number of the teeth 53 and the teeth 53 may have any suitable size and profile for mating with and operably engaging teeth 63 of the temperature door gear 60. Each of the teeth 53 may for example have an involute tooth profile, but any suitable tooth profile may be used without departing from the scope of the present invention. The outer circumferential surface 52 of the temperature link gear 50 formed at the second end 58 of the main body may have a substantially constant radius of curvature and may be arranged to rotate about the rotational axis 51 of the temperature link gear 50. The temperature link gear 50 is substantially similar to a substantially circular spur gear in use. However, the temperature link gear 50 may be substantially wedge-shaped to reduce a packaging size of the temperature link gear 50 because the temperature link gear 50 rotates through a relatively small angle of rotation during use of the control mechanism 34, thereby eliminating the need for a substantially circular spur gear having teeth formed around an entirety of a circumference thereof.

The main body of the temperature link gear 50 further includes a planar face 54 (shown in FIG. 2) formed between the rotational axis 51 and the outer circumferential surface 52 thereof while arranged on a plane perpendicular to the rotational axis 51. A temperature cam follower 55 extends from the face 54 of the temperature link gear 50 in a direction parallel to the rotational axis 51 thereof. The temperature cam follower 55 is spaced apart from each of the rotational axis 51 and the outer circumferential surface 52 of the temperature link gear 50. The temperature cam follower 55 may be a pin or projection configured to be slidably received in the temperature cam track 45 of the temperature cam gear 40. For example, the temperature cam follower 55 may be a pin or projection slidably disposed within the slot or opening forming the temperature cam track 45 in a manner wherein rotation of the temperature cam gear 40 causes the temperature cam follower 55 to follow the temperature cam track 45, thereby causing rotation of the temperature link gear 50 during portions of a rotation of the actuator 3 as prescribed by a shape and configuration of the temperature cam track 45.

The mode link gear 80 is formed from an elongate main body extending from a first end 87 to a second end 88 thereof. The first end 87 of the main body is rotatably coupled to the mounting bracket 36 and forms a rotational axis 81 of the mode link gear 80 arranged in parallel to the rotational axes 41, 51, 71. The mode link gear 80 may be rotatably coupled to the mounting bracket 36 using any known coupling or structure suitable for transferring rotational motion. The mode link gear 80 may for example include an axle (not shown) extending from the first end 87 of the main body in parallel to the rotational axis 81 and rotatably engaging a surface defining an aperture (not shown) formed in the mounting bracket 36 to allow the temperature link gear 80 to rotate about the rotational axis 81 relative to the stationary mounting bracket 36. Alternatively, an axle (not shown) may extend from the mounting bracket 36 for engaging a surface defining an aperture formed in the mode libk gear 80. The rotational axis 81 of the mode link gear 80 is spaced apart from the rotational axis 71 of the mode cam gear 70.

The second end 88 of the main body is substantially arcuate in shape and forms an outer circumferential surface 82 of the mode link gear 80. The second end 88 of the main body includes a plurality of teeth 83 extending radially outwardly relative to the rotational axis 81 of the mode link gear 80. The mode link gear 80 may include any suitable number of the teeth 83 and the teeth 83 may have any suitable size and profile for mating with and operably engaging teeth 93 of the mode door gear 90. Each of the teeth 83 may for example have an involute tooth profile, but any suitable tooth profile may be used without departing from the scope of the present invention. The outer circumferential surface 82 of the mode link gear 80 formed at the second end 88 of the main body may have a substantially constant radius of curvature and may be arranged to rotate about the rotational axis 81 of the mode link gear 80. The mode link gear 80 is substantially similar in operation to a substantially circular spur gear. However, the mode link gear 80 may be substantially wedge-shaped to reduce a packaging size of the mode link gear 80 because the mode link gear 80 rotates through a relatively small angle of rotation during use of the control mechanism 34, thereby eliminating the need for a substantially circular spur gear having teeth formed around an entirety of a circumference thereof.

The main body of the mode link gear 80 further includes a planar face 84 (shown in FIG. 2) formed between the rotational axis 81 and the outer circumferential surface 82 thereof while arranged on a plane perpendicular to the rotational axis 81. A mode cam follower 85 extends from the face 84 of the mode link gear 80 in a direction parallel to the rotational axis 81 thereof. The mode cam follower 85 is formed between and spaced apart from each of the rotational axis 81 and the outer circumferential surface 82 of the mode link gear 80. The mode cam follower 85 may be a pin or projection configured to be slidably received in the mode cam track 75 of the mode cam gear 70. For example, the mode cam follower 85 may be a pin or projection slidably disposed within the slot or opening forming the mode cam track 75 in a manner wherein rotation of the mode cam gear 70 causes the mode cam follower 85 to follow the mode cam track 75, thereby causing rotation of the mode link gear 80 during portions of the rotation of the actuator 3 as prescribed by a shape and configuration of the mode cam track 75.

The temperature door gear 60 is formed from a main body extending from a first end 67 to a second end 68 thereof. The first end 67 of the main body is rotatably coupled to the temperature door shaft 29 of the temperature door 28. Accordingly, the first end 67 of the temperature door gear 60 forms a rotational axis 61 thereof arranged parallel to the rotational axes 41, 51, 71, 81. The temperature door gear 60 is therefore configured to transfer rotational motion of the temperature door gear 60 about the rotational axis 61 thereof to the temperature door 28 to rotate the temperature door 28 between the first position and the second position thereof.

The second end 68 of the main body is substantially arcuate in shape and forms an outer circumferential surface 62 of the temperature door gear 60. The second end 68 of the main body includes a plurality of the teeth 63 extending radially outwardly relative to the rotational axis 61 of the temperature door gear 60. The temperature door gear 60 may include any suitable number of the teeth 63 and the teeth 63 may have any suitable size and profile for mating with and operably engaging the teeth 53 of the temperature link gear 50. Each of the teeth 63 may for example have an involute tooth profile, but any suitable tooth profile may be used without departing from the scope of the present invention. The outer circumferential surface 62 of the temperature door gear 60 formed at the second end 68 of the main body may have a substantially constant radius of curvature and may be arranged concentrically relative to the rotational axis 61 of the temperature door gear 60. The temperature door gear 60 is substantially similar in operation to a substantially circular spur gear. However, the temperature door gear 60 may be substantially wedge-shaped to reduce a packaging size of the temperature door gear 60 because the temperature door gear 60 rotates through a relatively small angle of rotation during use of the control mechanism 34, thereby eliminating the need for a substantially circular spur gear having teeth formed around an entirety of a circumference thereof.

The mode door gear 90 is formed from a main body extending from a first end 97 to a second end 98 thereof. The first end 97 of the main body is rotatably coupled to the mode door shaft 33 of the mode door 32. Accordingly, the first end 97 of the mode door gear 90 forms a rotational axis 91 thereof arranged parallel to the rotational axes 41, 51, 61, 71, 81. The mode door gear 90 is therefore configured to transfer rotational motion of the mode door gear 90 about the rotational axis 91 thereof to the mode door 32 to rotate the mode door 32 between the first position and the second position thereof.

The second end 98 of the main body is substantially arcuate in shape and forms an outer circumferential surface 92 of the mode door gear 90. The second end 98 of the main body includes a plurality of the teeth 93 extending radially outwardly relative to the rotational axis 91 of the mode door gear 90. The mode door gear 90 may include any suitable number of the teeth 93 and the teeth 93 may have any suitable size and profile for mating with and operably engaging the teeth 83 of the mode link gear 80. Each of the teeth 93 may for example have an involute tooth profile, but any suitable tooth profile may be used without departing from the scope of the present invention. The outer circumferential surface 92 of the mode door gear 90 formed at the second end 98 of the main body may have a substantially constant radius of curvature and may be arranged concentrically relative to the rotational axis 91 of the mode door gear 90. The mode door gear 90 is substantially similar in operation to a substantially circular spur gear. However, the mode door gear 90 may be substantially wedge-shaped to reduce a packaging size of the mode door gear 90 because the mode door gear 90 rotates through a relatively small angle of rotation during use of the control mechanism 34, thereby eliminating the need for a substantially circular spur gear having teeth formed around an entirety of a circumference thereof.

The temperature cam gear 40, the temperature link gear 50, the temperature door gear 60, the mode cam gear 70, the mode link gear 80, and the mode door gear 90 have been described as having outer circumferential surfaces having a substantially circular profile or a substantially constant radius of curvature resulting in the teeth 43, 53, 63, 73, 83, 93 of each respective gear 40, 50, 60, 70, 80, 90 rotating relative to the rotational axis 41, 51, 61, 71, 81, 91 of each respective gear 40, 50, 60, 70, 80, 90. However, it should be appreciated by one skilled in the art that alternative configurations of the gears 40, 50, 60, 70, 80, 90, including gears having irregular or non-constant radii of curvature, may be used without departing from the scope of the present invention as long as the rotational motion of the actuator 3 is transferred to each of the gears 40, 50, 60, 70, 80, 90 described herein in a manner consistent with the present disclosure.

Figure 5:
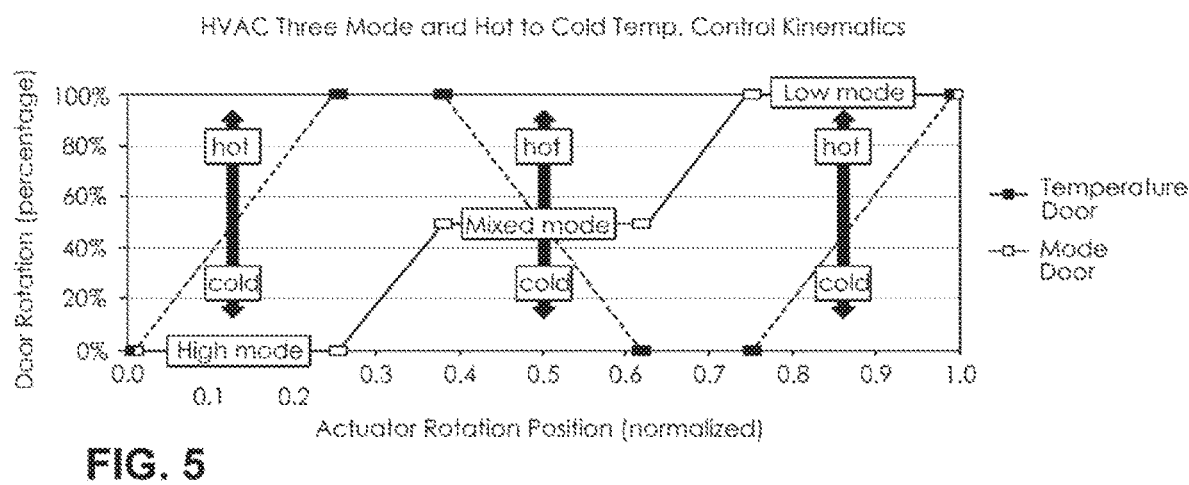
FIG. 5 is a graphical illustration of various operating modes of the air handling system of FIGS. 1-4.

Referring now to FIGS. 3-5, the ability of the control mechanism 34 to simultaneously control a rotational position of each of the temperature door 28 and the mode door 32 using a single actuator 3 is described with reference to operation of the control mechanism 34.

FIG. 5 is a diagram showing a relationship between a normalized rotational position of the actuator 3 and a rotational position of each of the temperature door 28 and the mode door 32. The normalized rotational position refers to a percentage of a total angle of rotation undergone by the actuator 3 when rotating through a full rotational cycle of the actuator 3 including all possible modes achievable by the control mechanism 34. As should be understood by one skilled in the art, the rotating arm of the actuator 3 may undergo multiple full revolutions for each full revolution of the temperature cam gear 40 and the mode cam gear 70 depending on the type of mechanical connection formed between the temperature cam gear 40 and the actuator 3. Accordingly, a normalized rotational position of 0.0 indicates that the actuator 3 has undergone no rotation, a normalized rotational position of 0.5 indicates that the actuator 3 has rotated through half of an angle of rotation of the actuator 3 (which may include multiple revolutions) required to complete a full cycle, and a normalized rotational position of 1.0 indicates that the actuator 3 has rotated through the entire angle of rotation of the actuator 3 (which may include multiple revolutions) and has completed a full cycle including operation of the air handling system 1 in each of the possible modes of operation.

FIG. 3 shows an initial position of the control mechanism 34 corresponding to a normalized actuator rotation position of 0.0. When in the normalized actuator position of 0.0, the temperature door 28 and the mode door 32 are each indicated in FIG. 5 as having a door rotation percentage of 0%. With reference to FIG. 3, an end of the arcuate outer circumferential surface 52 of the temperature link gear 50 is operably engaged with an end of the arcuate outer circumferential surface 62 of the temperature door gear 60, thereby allowing for rotation of the temperature door gear 60 and therefore the temperature door 28 in only one rotational direction. With reference to FIG. 1, this initial position of the temperature door 28 corresponds to the previously described first position of the temperature door 28 wherein the warm air passageway 8 is blocked by the temperature door 28, thereby causing the flow of air to flow exclusively through the cold air passageway 7. Accordingly, the first position of the temperature door 28 results in the exclusive introduction of cold air into the passenger compartment 104 of the motor vehicle 101. This relationship is indicated in FIG. 5 where a door rotation percentage of the temperature door 28 of 0% is shown as being on a "cold" end of a spectrum of available temperatures of the flow of air delivered by the air handling system 1.

With renewed reference to FIG. 3, an end of the arcuate outer circumferential surface 82 of the mode link gear 80 is operably engaged with an end of the arcuate outer circumferential surface 92 of the mode door gear 90, thereby allowing for rotation of the mode door gear 90 and therefore the mode door 32 in only one rotational direction. With reference to FIG. 1, this initial position of the mode door 32 corresponds to the previously described first position of the mode door 32 wherein the mode door 32 is rotated to block passage of the flow of air through the second conduit 10. When in the first position, the flow of the air flows exclusively through the first conduit 9, which is directed toward the upper vents 102 of the passenger compartment 104. Accordingly, as indicated in FIG. 5, the door rotation percentage of the mode door 32 of 0% corresponds to the "high mode" of the air handling system 1 wherein the flow of air is directed toward upper portions of the passenger compartment 104, such as the windshield area, for example.

FIG. 4 illustrates the temperature cam gear 40 and the mode cam gear 70 in the absence of the remainder of the control mechanism 34 to illustrate the shape of each of the temperature cam track 45 and the mode cam track 75. The initial normalized actuator rotation position of 0.0 corresponds to the temperature cam follower 55 of the temperature link gear 50 slidably engaged with a portion of the temperature cam track 45 indicated as position $T_0$. The initial normalized actuator rotation position of 0.0 similarly corresponds to the mode cam follower 85 of the mode link gear 80 slidably engaged with a portion of the mode cam track 75 indicated as position $M_0$.

An initial rotation of the actuator 3 from the normalized actuator rotation position of 0.0 first causes the temperature cam gear 40 to rotate about the rotational axis 41 thereof. The rotation of the temperature cam gear 40 is shown from the perspective of FIGS. 3 and 4 as being in a clockwise rotational direction. The rotation of the temperature cam gear 40 causes the mode cam gear 70 to rotate in an opposite rotational direction (counter-clockwise from the perspectives of FIGS. 3 and 4). As the temperature cam gear 40 rotates about the rotational axis 41 thereof, the temperature cam follower 55 of the temperature link gear 50 is caused to follow the shape of the temperature cam track 45. Similarly, as the mode cam gear 70 rotates about the rotational axis 71 thereof, the mode cam follower 85 of the mode link gear 80 is caused to follow the shape of the mode cam track 75.

As shown in FIG. 4, as the temperature cam gear 40 is initially rotated the temperature cam follower 55 will follow a path including the temperature cam follower 55 moving in a direction away from the position $T_0$ and toward a position along the temperature cam track 45 indicated as position $T_1$. The movement of the temperature cam follower 55 toward the position T1 causes the temperature cam follower 55 to move in a direction radially inwardly toward the rotational axis 41 of the temperature cam gear 40. This movement toward the rotational axis 41 causes the temperature link gear 50 to rotate about the rotational axis 51 formed at the first end 57 thereof in a counter-clockwise rotational direction from the perspective of FIGS. 3 and 4. The rotation of the temperature link gear 50 thereby causes the second end 58 of the temperature link gear 50 operably engaging the temperature door gear 60 to move relative thereto. The temperature link gear 50 thereby transfers the rotational motion thereof to the temperature door gear 60 which in turn rotates in a clockwise rotational direction from the perspective of FIGS. 3 and 4 about the rotational axis 61 thereof to rotate the temperature door 28 away from the first position to an intermediate position.

The rotation of the temperature door 28 away from the first position causes a portion of the warm air passageway 8 to become unblocked, thereby resulting in the flow of air being at least partially heated by the heater core 5. This relationship is shown in FIG. 5 as the rotation of the actuator 3 from the normalized actuator rotation position of 0.0 is shown as causing the temperature of the air delivered by the air handling system 1 to increase with respect to the degree of rotation of the actuator 3 until a normalized actuator rotation position of about 0.26 is achieved, which coincides with the position $T_1$. When the temperature cam follower 55 reaches the position $T_1$, the temperature door 28 has been rotated to a door rotation position of 100% which coincides with the temperature door 28 being rotated to the second position. When in the second position the temperature door 28 is rotated to a position entirely blocking the cold air passageway 7, hence the air delivered to the passenger compartment 104 will comprise only air that flows through the warm air passageway 9, as indicates by the diagram of FIG. 5.

In similar fashion, the rotation of the mode cam gear 70 about the rotational axis 71 thereof causes the mode cam follower 85 of the mode link gear 80 to move away from the position $M_0$ and to follow the path of the mode cam track 75 toward a position on the mode cam track 75 indicated as position $M_1$. The mode cam track 75 maintains a substantially constant distance from the rotational axis 71 of the mode cam gear 70 between the positions $M_0$ and $M_1$, thereby causing a position of the mode cam follower 85 to remain substantially unchanged relative to the rotational axis 71. Accordingly, the constant distance of the mode cam track 75 relative to the rotational axis 71 between the positions $M_0$ and $M_1$ causes the mode link gear 80 to remain substantially stationary while not rotating about the rotational axis 81 thereof. The lack of rotation of the mode link gear 80 in turn causes each of the mode door gear 90 and the mode door 32 to remain in their initial positions shown in FIG. 3, meaning that the mode door 32 will remain in the "high mode" throughout a movement of the mode cam follower 85 along the portion of the mode cam track 75 extending from the position $M_0$ to the position $M_1$. As indicated in FIG. 5, the mode door 32 will accordingly remain in the "high mode" until the normalized actuator rotation position reaches a value of about 0.26, which coincides with the position $M_1$.

It should therefore be clear that a distance of the temperature cam follower 55 from the rotational axis 41 of the temperature cam gear 40 directly affects a rotational position of the temperature link gear 50, which in turn directly affects the rotational positions of each of the temperature door gear 60 and the temperature door 28. Similarly, it should be clear that a distance of the mode cam follower 85 from the rotational axis 71 of the mode cam gear 70 directly affects a rotational position of the mode link gear 80, which in turn directly affects the rotational positions of each of the mode door gear 90 and the mode door 32. As a general principle, portions of the temperature cam track 45 having a constant distance from the rotational axis 41 of the temperature cam gear 40 (also referred to as holding paths of the temperature cam track) will result in no rotation of the temperature door 28 during rotation of the actuator 3 while portions of the temperature cam track 45 having a varying distance from the rotational axis 41 (also referred to as variable paths of the temperature cam track) will result in rotation of the temperature door 28 during rotation of the actuator 3. Similarly, as a general principle, portions of the mode cam track 75 having a constant distance from the rotational axis 71 of the mode cam gear 70 (also referred to as holding paths of the mode cam track) will result in no rotation of the mode door 32 during rotation of the actuator 3 while portions of the mode cam track 75 having a varying distance from the rotational axis 71 (also referred to as variable paths of the mode cam track) will result in rotation of the mode door 32 during rotation of the actuator 3. Using these general principles of operation, the remaining operating modes of the control mechanism 34 will be briefly addressed in turn.

When the actuator 3 rotates from the normalized actuator rotation position of about 0.26 to a normalized actuator rotation position of about 0.37 the temperature cam follower 55 moves from the position $T_1$ to a position $T_2$ on the temperature cam track 45 while the mode cam follower 85 moves from the position $M_1$ to a position $M_2$ on the mode cam track 85. The temperature cam track 45 remains a constant distance from the rotational axis 41 along the portion of the temperature cam track 45 extending from the position $T_1$ to the position $T_2$, hence the temperature cam follower 55 remains substantially stationary, thereby resulting in the temperature door 28 remaining in the second position during the rotation of the actuator 3 from the normalized actuator rotation position of about 0.26 to the normalized actuator rotation position of about 0.37. The mode cam track 75 has an increasing distance from the rotational axis 71 of the mode cam gear 70 as the mode cam track 75 extends from the position $M_1$ to the position $M_2$. The increase in distance results in the mode link gear 80 rotating about the rotational axis 81 thereof to cause rotation of each of the mode door gear 90 and the mode door 32. As indicated in FIG. 5, the rotation of the mode door 32 results in the mode door 32 rotating through a range of intermediate positions wherein the flow of air is directed to upper vents 102 of the air handling system 1 as well as lower vents 103 of the air handling system 1, resulting in a "mixed mode" of operation as indicated in FIG. 5.

When the actuator 3 rotates from the normalized actuator rotation position of about 0.37 to a normalized actuator rotation position of about 0.63 the temperature cam follower 55 moves from the position $T_2$ to a position $T_3$ on the temperature cam track 45 while the mode cam follower 85 moves from the position $M_2$ to a position $M_3$ on the mode cam track 85. The temperature cam track 45 has an increasing distance from the rotational axis 41 of the temperature cam gear 40 along the portion of the temperature cam track 45 extending from the position $T_2$ to the position $T_3$. The increase in distance results in the temperature link gear 50 rotating about the rotational axis 51 thereof to cause rotation of each of the temperature door gear 60 and the temperature door 28. As indicated in FIG. 5, the rotation of the temperature door 28 results in the flow of air delivered to the passenger compartment 104 gradually and continuously decreasing in temperature as the actuator 3 rotates from the normalized actuator rotation position of about 0.37 to a normalized actuator rotation position of about 0.63. When the actuator 3 reaches the normalized actuator rotation position of about 0.63 the temperature door 28 will have returned to the first position wherein the temperature door 28 is blocking the warm air passageway 8 and allowing the entirety of the flow of air through the cold air passageway 7. The mode cam track 75 remains a constant distance from the rotational axis 71 of the mode cam gear 70 as the mode cam track 75 proceeds from the position $M_2$ to the position $M_3$, hence the mode cam follower 85 remains substantially stationary, thereby resulting in the mode door 32 remaining in the intermediate position wherein the flow of air is equally distributed to each of the upper vents 102 and the lower vents 103 during the rotation of the actuator 3 from the normalized actuator rotation position of about 0.37 to the normalized actuator rotation position of about 0.63.

When the actuator 3 rotates from the normalized actuator rotation position of about 0.63 to a normalized actuator rotation position of about 0.76 the temperature cam follower 55 moves from the position $T_3$ to a position $T_4$ on the temperature cam track 45 while the mode cam follower 85 moves from the position $M_3$ to a position $M_4$ on the mode cam track 85. The temperature cam track 45 remains a constant distance from the rotational axis 41 along the portion of the temperature cam track 45 extending from the position $T_3$ to the position $T_4$, hence the temperature cam follower 55 remains substantially stationary, thereby resulting in the temperature door 28 remaining in the first position during the rotation of the actuator 3 from the normalized actuator rotation position of about 0.63 to the normalized actuator rotation position of about 0.76. The mode cam track 75 has an increasing distance from the rotational axis 71 of the mode cam gear 70 as the mode cam track 75 extends from the position $M_3$ to the position $M_4$. The increase in distance results in the mode link gear 80 rotating about the rotational axis 81 thereof to cause rotation of each of the mode door gear 90 and the mode door 32. As indicated in FIG. 5, the rotation of the mode door 32 results in the mode door 32 rotating through a range of intermediate positions wherein the flow of air is directed to upper vents 102 of the air handling system 1 as well as lower vents 103 of the air handling system 1. When the actuator 3 reaches a normalized actuator rotation position of about 0.76 the mode door 32 is rotated to the second position wherein the flow of air is directed exclusively to the lower vents 103 of the passenger compartment 104, resulting in a "low mode" of operation as indicated in FIG. 5.

When the actuator 3 rotates from the normalized actuator rotation position of about 0.76 to a normalized actuator rotation position of 1.0 the temperature cam follower 55 moves from the position $T_4$ to a position $T_5$ on the temperature cam track 45 while the mode cam follower 85 moves from the position $M_4$ to a position $M_5$ on the mode cam track 85. The temperature cam track 45 has a decreasing distance from the rotational axis 41 of the temperature cam gear 40 along the portion of the temperature cam track 45 extending from the position $T_4$ to the position $T_5$. The decrease in distance results in the temperature link gear 50 rotating about the rotational axis 51 thereof to cause rotation of each of the temperature door gear 60 and the temperature door 28. As indicated in FIG. 5, the rotation of the temperature door 28 results in the flow of air delivered to the passenger compartment 104 gradually and continuously increasing in temperature as the actuator 3 rotates from the normalized actuator rotation position of about 0.76 to the normalized actuator rotation position of 1.0. When the actuator 3 reaches the normalized actuator rotation position of 1.0 the temperature door 28 will have returned to the second position wherein the temperature door 28 is blocking the cold air passageway 7 and allowing the entirety of the flow of air through the warm air passageway 8. The mode cam track 75 remains a constant distance from the rotational axis 71 of the mode cam gear 70 as the mode cam track 75 proceeds from the position $M_4$ to the position $M_5$, hence the mode cam follower 85 remains substantially stationary, thereby resulting in the mode door 32 remaining in the "low mode" position wherein the flow of air is distributed only to the lower vents 103 during the rotation of the actuator 3 from the normalized actuator rotation position of about 0.76 to the normalized actuator rotation position of 1.0.

The control mechanism 34 is accordingly configured to rotate each of the temperature door 28 and the mode door 32 to predetermined rotational positions associated with predetermined angles of rotation of the single actuator 3 driving the control mechanism 34, and the predetermined rotational position of the temperature door 28 is determined by the shape of the temperature cam track 45 and the predetermined rotational position of the mode door 32 is determined by the shape of the mode cam track 75. The control mechanism 34 is further configured to provide independent temperature control for each of a high mode of operation, a low mode of operation, and a mixed mode of operation.

As should be understood, the actuator 3 may be caused to rotate in either of two rotational directions to adjust the air handling system 1 to any of the operating modes associated with any of the normalized actuator rotation positions described hereinabove. Accordingly, as indicated in the diagram of FIG. 5, the air handling system 1 allows for both the temperature door 28 and the mode door 32 to be adjusted to a variety of positions resulting in a variety of operating modes of the air handling system 1 by means of the rotation of the single actuator 3. A temperature of the flow of air may accordingly be adjusted from cold to hot while the air is delivered exclusively to the upper vents 102 of the passenger compartment 104, exclusively to the lower vents 103 of the passenger compartment 104, and to each of the upper vents 102 and the lower vents 103 of the passenger compartment 104. Additionally, a percentage of the flow of air delivered to the lower vents 103 and the upper vents 102 may be varied while a temperature of the air is maximized or minimized.

It should be appreciated by one skilled in the art that the general principles of operation of the control mechanism 34 may be adapted for use with a variety of different control mechanisms having substantially similar components but different sizes, packaging arrangements, and configurations. For example, a change in a position of any of the aforementioned rotational axes 41, 51, 61, 71, 81, 91 or a change in size of any of the aforementioned gears 40, 50, 60, 70, 80, 90 may alter an operation of the control mechanism 34 or require each of the temperature cam track 45 and the mode cam track 75 to be redesigned to account for the differences in relative positioning between the gears 40, 50, 60, 70, 80, 90. It should also be understood that the actuator 3 may be configured to operably engage and drive the mode cam gear 70 instead of the temperature cam gear 40 without altering the principles of operation of the control mechanism 34. For example, if the actuator 3 is operably engaged with the mode cam gear 70 instead of the temperature cam gear 40, the actuator 3 only requires rotation in an opposite rotational direction in comparison to that shown in FIGS. 3 and 4 in order to produce the plurality of operating modes illustrated by the diagram of FIG. 5. Additionally, it should be understood that the aforementioned normalized actuator rotation positions indicated as changing a mode of operation of the air handling system 1 are dependent on the contour of each of the temperature cam track 45 and the mode cam track 75, hence alteration of either cam track 45, 75 may result in the mode of operation of the air handling system 1 changing for different values of the normalized actuator rotation positions.

It should also be appreciated by one skilled in the art that the general concepts relating to the control mechanism 34 may applied to the control of any variety of different rotational components disposed within the main housing 12. For example, instead of controlling the rotational position of each of one temperature door and one mode door, the control mechanism 34 may instead be configured to control the rotational position of each of a pair of mode doors or each of a pair of temperature doors.

If a pair of mode doors is employed, one of the mode doors may be disposed at a first branch point of the air handling system 1 while the other mode door may be disposed at a second branch point of the air handling system 1. In some embodiments, the first branch point and the second branch point may be formed in separate flow paths of the air handling system 1 while in other embodiments the first branch point may be disposed upstream or downstream of the second branch point with respect to a direction of flow of the supply of the air through the air handling system 1. The first branch point may for example divide the supply of the air between the lower vents 103 and the upper vents 102 while the second branch point may for example further divide the flow of air directed toward one of the lower vents 103 or the upper vents 102, such as dividing the flow between two adjacent vents of either of the lower vents 103 or the upper vents 102. Additionally, it should be understood that the current invention is not limited to an air handling system 1 wherein the flow of air is divided between the lower vents 103 and the upper vents 102 thereof, but may be adapted for use with any air handling system 1 wherein the flow of air is divided at least once following a conditioning of the air for directing the flow of the air towards different regions of the passenger compartment 104.

If a pair of temperature doors is employed, one of the temperature doors may be adapted to control the flow of the air through a first passageway having a heating or cooling device disposed therein while the other of the temperature doors may be adapted to control the flow of the air through a second passageway having a heating or cooling device disposed therein. In some embodiments, the first passageway and the second passageway may be disposed in a parallel flow arrangement while in other embodiments the first passageway may be disposed upstream or downstream of the second passageway with respect to the direction of the flow of the air through the air handling system 1. It should also be appreciated that other configurations may be used, as desired.

It should further be appreciated by one skilled in the art that the control mechanism 34 may be further adapted to concurrently control the rotational positions of three or more rotational components disposed within the main housing 12, including any combination of two or more mode doors and two or more temperature doors, for example. The addition of a third cam gear having a suitable cam track may be caused to operably engage one of the temperature cam gear 40 or the mode cam gear 70 to cause the third cam gear to rotate in response to actuation of the actuator 3. A third link gear having a cam track follower slidably engaging the cam track of the third cam gear may then be caused to rotate in response to changes in the shape of the cam track of the third cam gear as the cam follower traverses the cam track. The third link gear may accordingly be operably engaged with a third door gear configured to cause rotation of a third door disposed within the main housing 12 in response to rotation of the third link gear. Accordingly, each additional door in need of rotation requires an additional cam gear having a cam track, an additional link gear having a cam follower slidably engaging the cam track, and an additional door gear for rotating the corresponding door. This process may be repeated as many times as needed to provide concurrent control to as many doors disposed within the main housing 12 as desired to produce each desired operational mode of the air handling system 1.

It should also be further appreciated by one skilled in the art that the control mechanism 34 may be further adapted to carry out the method of controlling the two or more doors using only a single one of the cam gears 40, 70. For example, instead of using two cam gears 40, 70 engaged with each other in order to rotate in unison, a single cam gear (not shown) may be used that includes each of a temperature cam track (not shown) and a mode cam track (not shown) formed therein, wherein rotation of the single cam gear causes each of the temperature link gear 50 and the mode link gear 80 to follow the corresponding cam tracks to control at least two doors using a single cam gear. The two distinct cam tracks formed in the single cam gear may be formed in a common face of the cam gear (while preferably not intersecting each other) or may be formed in opposing faces of the cam gear. It should be appreciated by one skilled in the art that the formation of a single cam gear having two or more cam tracks may require a modification of the positioning and orientation of the other components of the control mechanism 34 to allow the control mechanism 34 to carry out each of the desired operating modes of the air handling system 1, as desired.

Accordingly, from the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air handling system for a heating, ventilation, and air conditioning system of a motor vehicle having a passenger compartment, the air handling system comprising:
    a main housing having a temperature door rotatably disposed therein and a mode door rotatably disposed therein; and
    a control mechanism driven by a single actuator, the control mechanism configured to control a rotational position of each of the temperature door and the mode door, the control mechanism comprising:
        a temperature cam gear rotatable about a first rotational axis and including a temperature cam track formed therein to determine a rotational position of the temperature door; and
        a mode cam gear rotatable about a second rotational axis and including a mode cam track formed therein to determine a rotational position of the mode door, the mode cam gear operably engaged with the temperature cam gear to transfer rotational motion therebetween, wherein the single actuator is operably engaged with and rotating one of the temperature cam gear or the mode cam gear,
        a mounting bracket rotatably receiving the temperature cam gear and the mode cam gear;
        a temperature link gear including a third rotational axis, the temperature link gear rotatably fixed to the mounting bracket, the temperature link gear further including a plurality of gear teeth and a temperature cam follower engaged with the temperature cam track and disposed between the third rotational axis and the plurality of the gear teeth of the temperature link gear;
        a mode link gear including a fourth rotational axis, the mode link gear rotatably fixed to the mounting bracket, the mode link gear further including a plurality of gear teeth and a mode cam follower engaged with the mode cam track and disposed between the fourth rotational axis and the plurality of the gear teeth of the mode link gear;
        a temperature door gear engaged with the plurality of gear teeth of the temperature link gear and rotating the temperature door; and
        a mode door gear engaged with the plurality of gear teeth of the mode link gear and rotating the mode door.

2. The air handling system of claim 1, wherein one side of the temperature cam gear faces an inner side of the mounting bracket, and the other side of the temperature cam gear faces the temperature link gear.

3. The air handling system of claim 1, wherein one side of the mode cam gear faces an inner side of the mounting bracket, and the other side of the mode cam gear faces the mode link gear.

4. The air handling system of claim 1, wherein the single actuator is mounted on the mounting bracket.

5. The air handling system of claim 1, wherein when the rotational position of the temperature door is changed the rotational position of the mode door is maintained, and wherein when the rotational position of the mode door is changed the rotational position of the temperature door is maintained.

* * * * *